United States Patent
Agrawal et al.

(10) Patent No.: US 11,165,471 B2
(45) Date of Patent: Nov. 2, 2021

(54) OVER THE AIR COUPLING FOR DIGITAL PRE-DISTORTION CALIBRATION

(71) Applicant: SEMICONDUCTOR COMPONENTS INDUSTRIES, LLC, Phoenix, AZ (US)

(72) Inventors: Abhishek Kumar Agrawal, Fremont, CA (US); Hossein Dehghan, Diablo, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/776,802

(22) Filed: Jan. 30, 2020

(65) Prior Publication Data
US 2021/0242909 A1 Aug. 5, 2021

(51) Int. Cl.
*H04B 7/0413* (2017.01)
*H04B 1/40* (2015.01)

(52) U.S. Cl.
CPC ............ *H04B 7/0413* (2013.01); *H04B 1/40* (2013.01)

(58) Field of Classification Search
CPC .............................. H04B 7/0413; H04B 1/40
USPC ........................................ 375/267, 296, 297
See application file for complete search history.

(56) References Cited

U.S. PATENT DOCUMENTS

| 9,537,519 | B2 | 1/2017 | El-Hassan et al. |
| 10,560,140 | B1 | 2/2020 | Wu et al. |
| 10,911,162 | B1 | 2/2021 | Agrawal et al. |
| 2006/0189284 | A1* | 8/2006 | Yamawaki ............. H04B 1/406 455/127.2 |
| 2008/0049868 | A1* | 2/2008 | Brobston .............. H04L 27/368 375/297 |

(Continued)

FOREIGN PATENT DOCUMENTS

WO 2012168801 A1 12/2012

OTHER PUBLICATIONS

Eui-Rim Jeong et al., "A low cost adaptive digital predistorter for linearization of power amplifiers in MIMO transmitters," IEICE Electronics Express, vol. 19, No. 6, 580-585, 2012.

(Continued)

*Primary Examiner* — Qutbuddin Ghulamali
(74) *Attorney, Agent, or Firm* — Maschoff Brennan

(57) ABSTRACT

A MIMO transceiver configured for digital pre-distortion may include a first communication chain configured to wirelessly transmit a signal at a first frequency. The first communication chain may include a pre-distorter circuit configured to accept parameters to pre-distort signals prior to transmission. The first communication chain may include a PA configured to amplify the signals of the first communication chain prior to transmission. The MIMO transceiver may include a second communication chain. The second communication chain may be configured to wirelessly receive the signal at the first frequency. The second communication chain may include a converter circuit configured to convert the signal to a baseband frequency. The second communication chain may include a buffer configured to buffer the signal at the baseband frequency. The MIMO transceiver may include a DPD circuit configured to calibrate the parameters based on the buffered signal to compensate for non-linearity in amplification by the PA.

21 Claims, 5 Drawing Sheets

(56) References Cited

U.S. PATENT DOCUMENTS

| | | | |
|---|---|---|---|
| 2010/0166110 A1 | 7/2010 | Neumann et al. | |
| 2010/0202563 A1* | 8/2010 | Yan | H03F 1/3247 375/296 |
| 2011/0021138 A1* | 1/2011 | Rofougaran | H04B 1/40 455/39 |
| 2011/0150130 A1* | 6/2011 | Kenington | H03F 3/24 375/296 |
| 2011/0170630 A1* | 7/2011 | Silverman | H04L 25/03343 375/296 |
| 2012/0328050 A1* | 12/2012 | Bai | H03F 1/3258 375/297 |
| 2013/0049858 A1* | 2/2013 | Wimpenny | H03F 3/68 330/84 |
| 2013/0052964 A1* | 2/2013 | Husted | H04B 17/11 455/73 |
| 2016/0028439 A1* | 1/2016 | Tahir | H04B 3/54 375/257 |
| 2016/0119925 A1* | 4/2016 | Roessel | H04L 5/0085 370/329 |
| 2016/0344483 A1 | 11/2016 | Kareisto et al. | |
| 2018/0092048 A1 | 3/2018 | Cheng et al. | |
| 2019/0089389 A1* | 3/2019 | Gutman | H03F 1/3247 |
| 2019/0280730 A1* | 9/2019 | Zhang | H04B 1/0475 |
| 2020/0119755 A1 | 4/2020 | Mahmood et al. | |
| 2020/0382172 A1* | 12/2020 | Sethuraman | H04B 7/0697 |

OTHER PUBLICATIONS

Kelly Mekechuk et al., "Linearizing Power Amplifiers Using Digital Predistortion, EDA Tools and Test Hardware," High Frequency Electronics, 7 pages, Apr. 2004.

Luis Carolos Vieira et al. "Experimental demonstration of digital predistortion for orthogonal frequency-division multiplexing-radio over fibre links near laster resonance," IET Journals, IET Optoelectronics, 2015, vol. 9, Iss. 6, pp. 310-316.

Office Action dated Jun. 25, 2020 in U.S. Appl. No. 16/776,840.

Final Office Action dated Jul. 15, 2019 in U.S. Appl. No. 15/826,632.

Office Action dated Feb. 25, 2019 in U.S. Appl. No. 15/826,632.

* cited by examiner

OVER THE AIR COUPLING FOR DIGITAL PRE-DISTORTION CALIBRATION

FIELD

The implementations discussed in the present disclosure are related to over the air coupling for digital pre-distortion calibration.

BACKGROUND

Unless otherwise indicated in the present disclosure, the materials described in the present disclosure are not prior art to the claims in the present application and are not admitted to be prior art by inclusion in this section.

Wireless networks (e.g., wireless local area networks (WLANs) may include a multiple input multiple output (MIMO) transceiver for communicatively coupling computing devices connected to the wireless network to each other and/or providing access to the Internet. The MIMO transceiver may include multiple communication chains for wirelessly receiving signals from and wirelessly transmitting signals to the computing devices. The communication chains may include power amplifiers (PAs) that amplify the corresponding signals prior to transmission. The PAs may provide non-linear amplification of the signals, which may cause distortion in the signals and errors when the signals are received by the computing devices. The non-linearity in amplification provided by the PAs may be compensated for by pre-distorting the signals prior to amplification by the PAs.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One or more implementations of the present disclosure may include a MIMO transceiver. The MIMO transceiver may be configured for digital pre-distortion (DPD) calibration. The MIMO transceiver may include a first communication chain. The first communication chain may be configured to wirelessly transmit a signal at a first frequency. The first communication chain may include a pre-distorter circuit. The pre-distorter circuit may be configured to accept pre-distortion parameters to pre-distort signals prior to transmission. The first communication chain may also include a PA. The PA may be configured to amplify the signals of the first communication chain prior to transmission. The MIMO transceiver may also include a second communication chain. The second communication may be configured to wirelessly receive the signal at the first frequency. The second communication chain may also include a converter circuit. The converter circuit may be configured to convert the signal to a baseband frequency. In addition, the second communication chain may include a buffer. The buffer may be configured to buffer the signal at the baseband frequency. In addition, the MIMO transceiver may include a DPD circuit. The DPD circuit may be configured to calibrate the pre-distortion parameters. The pre-distortion parameters may be calibrated based on the buffered signal to compensate for non-linearity in amplification provided by the PA of the first communication chain.

One or more implementations of the present disclosure may include a method to operate a MIMO transceiver. The MIMO transceiver may be configured for DPD calibration. The method may include wirelessly transmitting a signal at a first frequency. The signal may be wirelessly transmitted from a first communication chain of the MIMO transceiver. The first communication chain may include a pre-distorter circuit configured to accept pre-distortion parameters to pre-distort signals prior to transmission. The first communication chain may also include a PA configured to amplify the signals of the first communication chain prior to transmission. The method may also include wirelessly receiving the signal at the first frequency. The signal may be received at a second communication chain of the MIMO transceiver. In addition, the method may include converting, by the second communication chain, the signal to a baseband frequency. Further, the method may include buffering, by the second communication chain, the signal at the baseband frequency. The method may include calibrating the pre-distortion parameters. The pre-distortion parameters may be calibrated based on the buffered signal to compensate for non-linearity in amplification provided by the PA of the first communication chain.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only example implementations of the invention and are therefore not to be considered limiting of its scope. The invention will be described and explained with additional specificity and detail through the use of the accompanying drawings in which.

DETAILED DESCRIPTION OF SOME EXAMPLE IMPLEMENTATIONS

Figure 1:
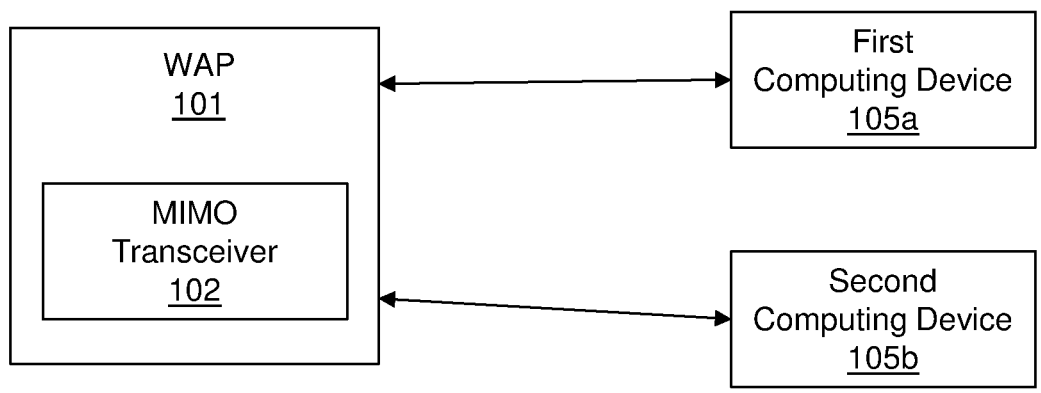
FIG. 1 illustrates an example environment in which a wireless access point (WAP) with a MIMO transceiver may be implemented.

Wireless networks (e.g., wireless local area networks (WLANs) may include multiple wireless nodes or devices that wirelessly communicate with each other. In an example implementation, the nodes may include a WAP, a relay, one or more STAs, and/or other wireless nodes. Each WAP, STA, and/or other wireless node may include a MIMO transceiver to send and/or receive wireless communications. Each MIMO transceiver may include multiple communication chains to permit simultaneous wireless communication between the MIMO transceiver and other wireless devices.

Each communication chain may include a receive portion configured to wirelessly receive and process signals from other wireless devices. In addition, each communication chain may include a transmit portion configured to process and amplify signals prior to transmission. In addition, the transmit portions may include non-ideal components that cause distortion of signals that are transmitted by the corresponding communication chains. For example, the transmit portions may include a PA that provides non-linear amplification of a power level of the signals prior to transmission. The non-linearity of amplification provided by the PAs may cause distortion in the signals. The distortion may degrade signal quality and reduce data rates of the corresponding signals.

The non-linearity in amplification provided by the PAs may be compensated for by performing DPD calibration and DPD application for one or more of the communication chains. DPD calibration may include calibrating pre-distortion parameters based on the non-linearity in amplification provided by the PAs. In addition, DPD application may include pre-distorting the signals (e.g., the signals may be pre-distorted prior to amplification by the PAs) based on the pre-distortion parameters. In some implementations, the signals may be pre-distorted in an opposite direction of the non-linear amplification provide by the PA to cause power levels of the signals, after amplification, to approach expected power levels.

In some implementations, the MIMO transceiver may include a DPD circuit configured to observe the amplification of the PAs. In these implementations, the DPD circuit may calibrate the pre-distortion parameters based on the observed amplification by the PAs. Some DPD technologies may include one or more dedicated DPD calibration chains for observing the amplification of the PAs. For example, some DPD technologies may include a dedicated DPD calibration chain for each communication chain in the MIMO transceiver. In these DPD technologies, a MIMO transceiver that includes eight communication chains, for example, may also include eight dedicated DPD calibration chains. Some DPD technologies include DPD calibration chains that share portions of receive chains and require additional circuitry.

In some DPD technologies, the DPD calibration chains may include a coupler (e.g., a radio frequency (RF) coupler) coupled to an output of the corresponding PA and/or a variable attenuator coupled to an output of the corresponding coupler. In addition, some dedicated DPD calibration chains may include downconverters, variable gain circuits, filters, and/or an observation receiver circuit configured to receive output of the corresponding PAs and measure the corresponding amplification. Some shared DPD calibration chains may include a multiplexer (MUX), e.g., to selectively couple to an output of the coupler rather than an output of an antenna in the corresponding receive chain. Further, in some DPD technologies, all of the communication chains of the MIMO transceiver may simultaneously be in transmit mode or receive mode. These DPD technologies may not permit a portion of the communication chains to be in the transmit mode while simultaneously permitting another portion of the communication chains to be in the receive mode.

These DPD technologies may cause a circuit footprint of the MIMO transceiver to be large due to the inclusion of the DPD calibration chains. For example, each of the coupler, the variable attenuator, the downconverters, the variable gain circuits, the filters, the observation receiver in the dedicated DPD chains and/or each of the coupler, the variable attenuator, and the MUX in the shared DPD chains may increase a circuit footprint of the communication chains. Further, these DPD technologies may increase a cost of producing the MIMO transceiver due to a cost of components in the DPD calibration chains. For example, each of the coupler, the variable attenuator, the downconverters, the variable gain circuits, the filters, the observation receiver, and/or the MUX increase the cost of producing the MIMO transceiver.

Some implementations described in the present disclosure may permit DPD calibration and/or DPD application to be performed for the communication chains of the MIMO transceiver without dedicated DPD calibration chains. Further, implementations described in the present disclosure may permit the communication chains to be coupled with each other using over-the-air (OTA) coupling. For example, implementations described in the present disclosure may permit a first communication chain to be in the transmit mode while simultaneously permitting a second communication chain to be in the receive mode. The first communication chain and the second communication chain may be wirelessly coupled to each other, e.g., through antennas in the first and second communication chains.

In some implementations, the first communication chain may wirelessly transmit a signal at a first frequency after amplification by the corresponding PA. In addition, the second communication chain may wirelessly receive the signal at the first frequency. The second communication chain may convert the signal from the first frequency to a baseband frequency. In addition, the second communication chain may buffer the signal at the baseband frequency. The DPD circuit may calibrate the pre-distortion parameters based on the signal buffered by the second communication chain. The pre-distortion parameters may be calibrated based on the non-linearity in amplification provided by the PA.

Some implementations described in the present disclosure may reduce the circuit footprint of the MIMO transceiver due to the fact that the communication chains themselves may be used for observing the amplification of the PAs without the need for, e.g., the coupler, the variable attenuator, the downconverters, the variable gain circuits, the filters, the observation receiver, and/or the MUX used in each of the dedicated or shared DPD circuits as described above. In addition, some implementations described in the present disclosure may reduce the cost of producing the MIMO transceiver since the coupler, the variable attenuator, the downconverters, the variable gain circuits, the filters, the observation receiver, and/or the MUX in the DPD calibration chains may not be included in the MIMO transceiver. In addition, some implementations described in the present disclosure may improve calibration of the pre-distortion parameters and performance of the receive chain when in regular receive mode by eliminating insertion loss of the MUX and/or other components in the DPD calibration chains.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example environment 100 in which a WAP 101 with a MIMO transceiver 102 may be implemented, in accordance with at least one implementation disclosed in the present disclosure. The environment 100 (e.g., an operational environment) may also include a first computing device 105a and a second computing device 105b (referenced collectively in the present disclosure as "computing devices 105"), each of which may include or be implemented as a STA.

The WAP 101 and the computing devices 105 may create a wireless network. In some implementations, the WAP 101 may provide access to the Internet for the computing devices 105. Example computing devices 105 may include personal computers, printers, televisions, digital video disc (DVD) players, security cameras, smartphones, tablets, smart devices, or any other appropriate computing device configured for wireless communication. Accordingly, each of the computing devices 105 may include a MIMO transceiver similar to the MIMO transceiver 102. In some implementations, the MIMO transceivers of the computing devices 105 may implement DPD calibration and DPD application as described herein.

The MIMO transceiver 102 of the WAP 101 may include multiple communication chains (not illustrated in FIG. 1) to allow simultaneous communication between the MIMO transceiver 102 and both of the computing devices 105. For example, the first computing device 105a may transmit signals to and receive signals from a first communication chain of the MIMO transceiver 102. As another example, the second computing device 105b may transmit signals to and receive signals from a second communication chain of the MIMO transceiver 102. The MIMO transceiver 102 may include four, eight, twelve or any other appropriate number of communication chains. The communication chains of the MIMO transceiver 102 are discussed in more detail below in relation to FIGS. 2 and 3.

Each communication chain may include a transmit portion. The transmit portion may perform functions associated with transmitting the signals to the computing devices 105. The transmit portions may include non-ideal components that cause distortion of the signals. For example, each of the transmit portions may include a PA that provides non-linear amplification of a power level of the corresponding signals. The non-linearity of amplification provided by the PAs may cause distortion in the signals. The distortion of the signals may degrade signal quality and reduce data rates of the corresponding signals.

The MIMO transceiver 102 may be configured to perform DPD calibration using OTA coupling of the communication chains. The MIMO transceiver 102 may perform DPD calibration and DPD application to compensate for the non-linearity in amplification provided by the PAs. DPD calibration may include calibrating pre-distortion parameters based on the non-linearity in amplification provided by the PAs. In addition, DPD application may include pre-distorting the signals (e.g., the signals may be distorted prior to amplification by the PAs) based on the pre-distortion parameters.

Figure 2:
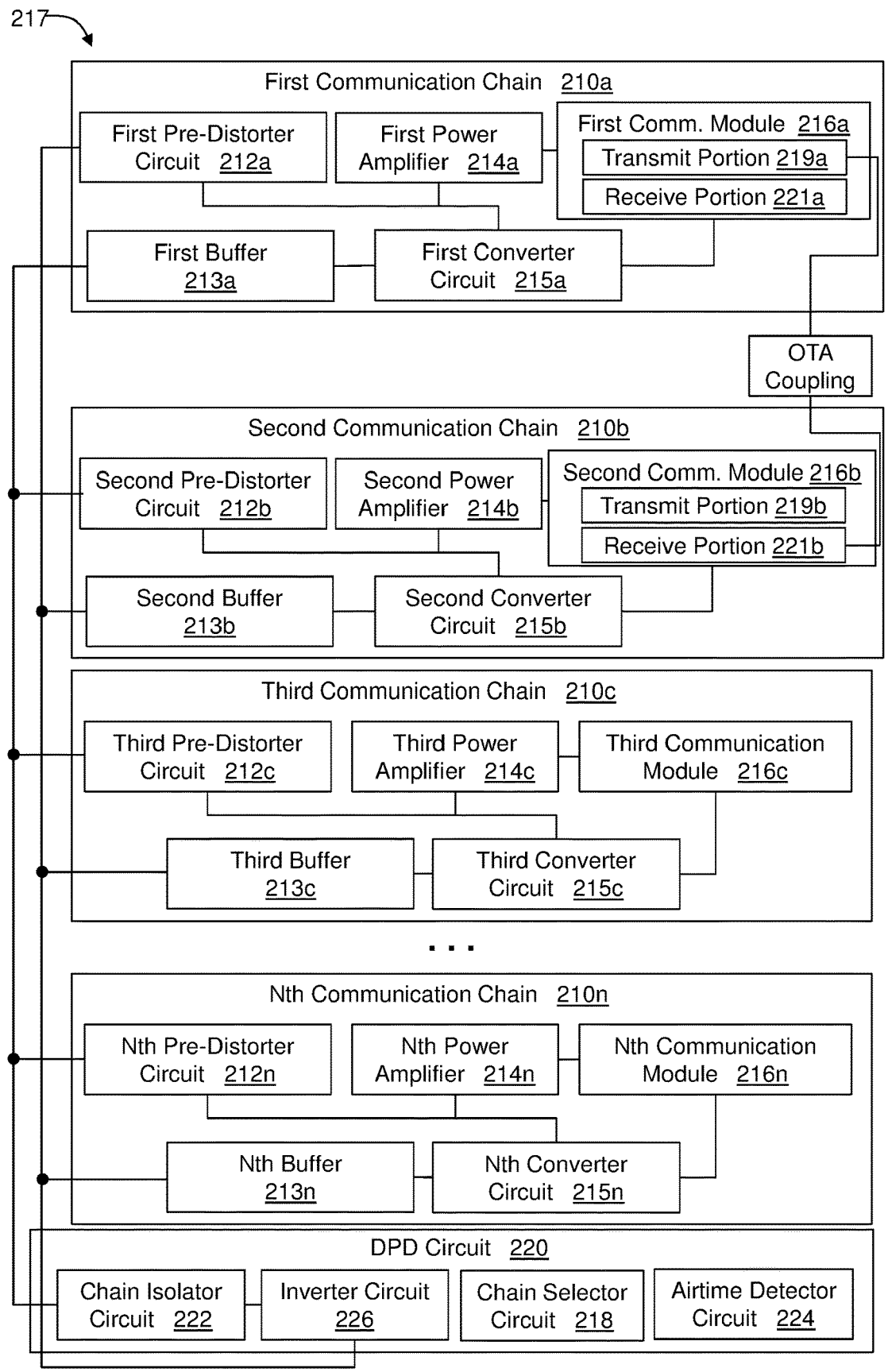
FIG. 2 illustrates an example MIMO transceiver that may be implemented in the environment of FIG. 1.

FIG. 2 illustrates an example MIMO transceiver 217 that may be implemented in the environment 100 of FIG. 1, in accordance with at least one implementation disclosed in the present disclosure. The MIMO transceiver 217 may correspond to the MIMO transceiver 102 of FIG. 1. For example, the MIMO transceiver 217 may be configured to perform DPD calibration using OTA coupling of communication chains 210. In addition, the MIMO transceiver 217 may be configured to perform DPD application for the communication chains 210.

The MIMO transceiver 217 may include a DPD circuit 220 and two or more communication chains 210. In the illustrated implementation, the MIMO transceiver 217 includes a first communication chain 210a, a second communication chain 210b, a third communication chain 210c, and a $N^{th}$ communication chain 210n (referenced collectively in the present disclosure as "communication chains 210"). As indicated by the ellipsis and the $N^{th}$ communication chain 210n in FIG. 2, the MIMO transceiver 217 may include any appropriate number of communication chains 210. The communication chains 210 may be individually configurable to be in the transmit mode or the receive mode. For example, during DPD calibration, the first communication chain 210a and the third communication chain 210c may be in the transmit mode while the second communication chain 210b may be in the receive mode. As another example, during DPD calibration, the first communication chain 210a may be in the receive mode and the second communication chain 210b and the third communication chain 210c may be in the transmit mode. Alternatively, during DPD calibration, a single one of the communication chains 210 may be in the transmit mode while a single one of the communication chains 210 may be in the receive mode, with the remaining communication chains 210 turned off.

The first communication chain 210a may include a first PA 214a. The second communication chain 210b may include a second PA 214b. The third communication chain 210c may include a third PA 214c. The first PA 214a, the second PA 214b, and the third PA 214c may provide non-linear amplification of signals to be transmitted by the corresponding communication chains 210. To compensate for the non-linear amplification, DPD calibration and DPD application may be performed for one or more of the communication chains 210.

In some implementations, DPD calibration may be performed before, during, or after operation of the MIMO transceiver 217. For example, DPD calibration may be performed during installation of the MIMO transceiver 217 in the environment 100. As another example, DPD calibration may be performed after an interval of time has elapsed since DPD calibration was last performed.

In some implementations after the interval of time has elapsed, an airtime detector circuit 224 may determine whether communication is occurring between one or more of the communication chains 210 and the computing device 105. For example, in some implementations, the airtime detector circuit 224 may determine if the transmit portions of the communication chains 210 are transmitting and/or if the receive portions of the communication chains 210 are receiving. In some implementations, if communications are occurring, the MIMO transceiver 217 may wait for the communications to end before performing DPD calibration. Alternatively, in some implementations, the airtime detector circuit 224 may determine whether the communications are below a communication threshold before the MIMO transceiver 217 performs DPD calibration. For example, the airtime detector circuit 224 may determine if a receive signal strength on one or more receive portions of the communication chains 210 from the computing devices 105 is below a threshold value such that the signals being received by the receive portions will not interfere with signals being wirelessly transmitted by the transmit portions of the communication chains 210. The threshold value may be determined by subtracting a signal to interference requirement programmed on the DPD circuit 220 from an expected receive signal strength of a signal wirelessly transmitted (e.g., coupled over the air) between the transmit portions and the receive portions of the communication chains. As yet another example, DPD calibration may be performed only during specified periods of time (e.g., between the hours of ten PM and seven AM) or triggered by certain events (e.g. a temperature change since last DPD calibration that is greater than a threshold temperature change, MIMO transmit frequency update, etc.).

An example of DPD calibration and DPD application that involves the first communication chain 210a in the transmit mode and the second communication chain 210b in the receive mode will now be discussed. The first communication chain 210a may include one or more of a first pre-distorter circuit 212a, the first PA 214a, a first communication module 216a, a first buffer 213a, and/or a first converter circuit 215a. Similarly, the second communication chain 210b may include one or more of a second pre-distorter circuit 212b, the second PA 214b, a second buffer 213b, a second converter circuit 215b, and/or a second communication module 216b. Each of the communication modules 216 may include a transmit portion and a receive portion. For example, the first communication module 216a may include a first transmit portion 219a and a first receive portion 221a. As another example, the second communication module 216b may include a second transmit portion 219b and a second receive portion 221b. The first pre-distorter circuit 212a may accept first pre-distortion parameters to pre-distort signals prior to transmission by the first communication module 216a. In addition, the first PA 214a may amplify the signals prior to transmission by the first communication module 216a.

The first communication chain 210a may generate a first signal at a first frequency. In some implementations, the first frequency may include a frequency within a RF band. The first PA 214a may amplify a power level of the first signal from an initial power level to an amplified power level. The first communication module 216a may receive the first signal at the first frequency and the amplified power level. In addition, the first transmit portion 219a of the first communication module 216a may wirelessly transmit the first signal at the first frequency and the amplified power level.

The second receive portion 221b of the second communication module 216b may wirelessly receive the first signal at the first frequency and the amplified power level. As illustrated in FIG. 2, in some embodiments, the first transmit portion 219a and the second receive portion 221b may be wirelessly coupled via OTA coupling. The box labelled "OTA Coupling" in FIG. 2 is illustrated for example purposes and more generally the first transmit portion 219a may be wirelessly coupled to any or all of the second receive portion 221b, the third communication module 216c, and the Nth communication module 216n. In addition, the second receive portion 221b may be wirelessly coupled to any or all of the first transmit portion 219a, the third communication module 216c, and the NTH communication module 216n. In some implementations, the second communication module 216b may include an external variable low noise amplifier (LNA) (not illustrated in FIG. 2). In these and other implementations, the external variable LNA of the second communication module 216b may receive the first signal at the first frequency and the amplified power level. In addition, the external variable LNA of the second communication module 216b may amplify the first signal at the first frequency to a first intermediate power level.

In some implementations, the second converter circuit 215b may receive the first signal at the first frequency and the first intermediate power level from the second communication module 216b. In other implementations, the second converter circuit 215b may receive the first signal at the first frequency and the amplified power level from the second communication module 216b.

In some implementations, the second converter circuit 215b may include an internal variable LNA (not illustrated in FIG. 2). In these and other implementations, the internal variable LNA of the second converter circuit 215b may receive the first signal at the first frequency and the first intermediate power level. In addition, the internal variable LNA of the second converter circuit 215b may amplify the first signal at the first frequency to a second intermediate power level. Amplification of the first signal by the external variable LNA of the second communication module 216b and the internal variable LNA of the second converter circuit 215b may be provided to compensate for insertion loss introduced by components in the second converter circuit 215b and/or the second buffer 213b (e.g., the receive portion of the second communication chain 210b may be configured as a liner receiver as discussed elsewhere in the present disclosure).

The second converter circuit 215b may downconvert the first signal to a baseband frequency. In some implementations, the second buffer 213b may receive and buffer the first signal at the baseband frequency and the second intermediate power level. In other implementations, the second buffer 213b may receive and buffer the first signal at the baseband frequency and the amplified power level. In some implementations, insertion loss introduced by the components in the second converter circuit 215b for downconverting the first signal to the baseband frequency and/or the second buffer 213b may cause the power level of the first signal to become the amplified power level at an output of the second buffer 213b.

The DPD circuit 220 may include a chain isolator circuit 222 and an inverter circuit 226. The chain isolator circuit 222 may receive the first signal at the baseband frequency and the amplified power level from the second buffer 213b (e.g., receive a buffered signal at the first frequency). The chain isolator circuit 222 may also receive the first signal at the baseband frequency and the initial power level. The chain isolator circuit 222 may provide the first signal at the baseband frequency and the initial power level to the inverter circuit 226. In addition, the chain isolator circuit 222 may provide the first signal at the baseband frequency and the amplified power level to the inverter circuit 226.

The inverter circuit 226 may calibrate the first pre-distortion parameters based on the first signal received from the second buffer 213b. The first pre-distortion parameters may be calibrated to compensate for the non-linearity in amplification of the first signal provided by the first PA 214a. For example, in some implementations, the first pre-distortion parameters may be calibrated as an additive inverse of the non-linearity in amplification provided by the first PA 214*a*.

In some implementations, the inverter circuit 226 may determine a difference between the first signal at the baseband frequency and the amplified power level and an expected signal at the baseband frequency and an expected power level. The inverter circuit 226 may calibrate the first pre-distortion parameters based on a difference between the amplified power level and the expected signal.

In some implementations, the inverter circuit 226 may determine an average power level of samples of the first signal at the baseband frequency and the initial power level (e.g., the first signal before amplification by the first PA 214*a*). In addition, the inverter circuit 226 may normalize the average power level of the samples of the first signal before amplification by the first PA 214*a* to a power level of signals transmitted by the one or more of the communication chains 210. The expected power level may be the normalized average power level of the first signal before amplification by the first PA 214*a*. The inverter circuit 226 may compare the amplified power level of the first signal at the baseband frequency to the expected power level. The inverter circuit 226 may calibrate the first pre-distortion parameters based on a difference between the amplified power level and the expected power level.

In some implementations, the inverter circuit 226 may compare the first signal at the baseband frequency and the amplified power level (e.g., the power level of the first signal after amplification by the first PA 214*a*) to the first signal at the baseband frequency and the initial power level (e.g., the power level of the first signal before amplification by the first PA 214*a*). A difference between the amplified power level and the initial power level may be determined (e.g., a difference between the power level of the first signal before and after amplification by the first PA 214*a* may be determined). The difference between the amplified power level and the initial power level may be compared to a level of amplification expected to be provided by the first PA 214*a*. The inverter circuit 226 may calibrate the first pre-distortion parameters based on the difference between the amplified power level and the initial power level compared to the level of amplification expected to be provided by the first PA 214*a*.

The inverter circuit 226 may provide the first pre-distortion parameters to the first pre-distorter circuit 212*a*. The first pre-distorter circuit 212*a* may pre-distort subsequent signals transmitted by the first communication module 216*a* based on the first pre-distortion parameters. For example, the first pre-distorter circuit 212*a* may pre-distort the subsequent signals equal to the additive inverse of the non-linearity in amplification provided by the first PA 214*a*. The pre-distortion of the subsequent signals may cause the subsequent signals to be more linear when received by the computing devices 105.

An example of DPD calibration and DPD application that involves the third communication chain 210*a* in the transmit mode and the second communication chain 210*b* in the receive mode will now be discussed. The third communication chain 210*c* may include one or more of a third pre-distorter circuit 212*c*, the third PA 214*c*, a third communication module 216*c*, a third buffer 213*c*, and/or a third converter circuit 215*c*. The third pre-distorter circuit 212*c* may accept third pre-distortion parameters to pre-distort signals prior to transmission by the third communication module 216*c*. In addition, the third PA 214*c* may amplify the signals prior to transmission by the third communication module 216*c*.

In some implementations, the DPD circuit 220 may also include a chain selector circuit 218. The chain selector circuit 218 may selectively control which of the communication chains 210 generate corresponding signals for performing DPD calibration. In these and other implementations, the chain selector circuit 218, responsive to calibration of the first pre-distortion parameters, may provide a transmit signal to communication chains 210. The transmit signal may indicate that the first communication chain 210*a* is to stop generating the first signal. Additionally, or alternatively, the transmit signal may indicate that the first communication chain 210*a* is to stop wireless transmission of the first signal. In addition, the transmit signal may indicate that the third communication chain 210*c* is to start generating a third signal at the first frequency.

The third communication chain 210*c* may generate the third signal at the first frequency. The third PA 214*c* may amplify the power level of the third signal at the first frequency to the amplified power level. The third communication module 216*c* may receive the third signal at the amplified power level from the first PA 214*a*. In addition, the third communication module 216*c* may wirelessly transmit the third signal at the first frequency and the amplified power level.

The second communication module 216*b* may wirelessly receive the third signal at the first frequency and the amplified power level. In some implementations, the external variable LNA of the second communication module 216*b* may receive the third signal at the first frequency and the amplified power level. In addition, the external variable LNA of the second communication module 216*b* may amplify the third signal at the first frequency to the first intermediate power level.

The second converter circuit 215*b* may receive the third signal at the first frequency and the first intermediate power level from the second communication module 216*b*. In some implementations, the internal variable LNA of the second converter circuit 215*b* may receive the third signal at the first frequency and the first intermediate power level. In addition, the internal variable LNA of the second converter circuit 215*b* may amplify the third signal at the first frequency to the second intermediate power level.

The second converter circuit 215*b* may downconvert the third signal to the baseband frequency. The second buffer 213*b* may receive and buffer the third signal at the baseband frequency and the second intermediate power level. In some implementations, the insertion loss introduced by the components in the second converter circuit 215*b* for downconverting the third signal to the baseband frequency and/or the second buffer 213*b* may cause the power level of the third signal to become the amplified power level at the output of the second buffer 213*b*.

The chain isolator circuit 222 may receive the third signal at the baseband frequency and the amplified power level from the second buffer 213*b*. The chain isolator circuit 222 may also receive the third signal at the baseband frequency and the initial power level (e.g., prior to amplification by the third PA 214*c*). The chain isolator circuit 222 may provide the third signal at the baseband frequency and the initial power level to the inverter circuit 226. In addition, the chain isolator circuit 222 may provide the third signal at the baseband frequency and the amplified power level to the inverter circuit 226.

The inverter circuit 226 may calibrate the third pre-distortion parameters to compensate for non-linearity in amplification of the third signal provided by the third PA 214c. The inverter circuit 226 may calibrate the third pre-distortion parameters in the same or similar manner as discussed above in relation to the first pre-distortion parameters. In addition, the third pre-distorter circuit 212c may pre-distort subsequent signals transmitted by the third communication module 216c based on the third pre-distortion parameters in the same or similar manner that the first pre-distorter circuit 212a pre-distorts subsequent signals to be transmitted by the first communication module 216a based on the first pre-distortion parameters.

An example of DPD calibration and DPD application that involves the second communication chain 210b in the transmit mode and the first communication chain 210a in the receive mode will now be discussed. Responsive to calibration of the first pre-distortion parameters and/or the third pre-distortion parameters, the chain selector circuit 218 may provide the transmit signal to the communication chains 210. The transmit signal may indicate that the third communication chain 210c is to stop generating the third signal and that the second communication chain 210b is to start generating a second signal. In addition, the transmit signal may indicate that the second communication chain 210b is to be in the transmit mode and the first communication chain 210a is to be in the receive mode. The following discussion is made using the first communication chain 210a for DPD calibration of the second communication chain 210b; more generally any other communication chain 210 except the second communication chain 210b may be used for DPD calibration of the second communication chain 210b.

The second pre-distorter circuit 212b may accept second pre-distortion parameters to pre-distort signals prior to transmission by the second communication module 216b. In addition, the second PA 214b may amplify the signals prior to transmission by the second communication module 216b.

The second communication chain 210b may generate the second signal at the first frequency. The second PA 214b may amplify the power level of the second signal to the amplified power level. The second communication module 216b may receive the second signal at the first frequency and the amplified power level. In addition, the second communication module 216b may wirelessly transmit the second signal at the first frequency and the amplified power level.

The first communication module 216a may wirelessly receive the second signal at the first frequency and the amplified power level. In some implementations, the first communication module 216a may include another external variable LNA (not illustrated in FIG. 2). In these and other implementations, the external variable LNA of the first communication module 216a may receive the second signal at the first frequency and the amplified power level. In addition, the external variable LNA of the first communication module 216a may amplify the second signal at the first frequency to the first intermediate power level.

The first converter circuit 215a may receive the second signal at the first frequency and the first intermediate power level from the first communication module 216a. In some implementations, the first converter circuit 215a may include another internal variable LNA (not illustrated in FIG. 2). In these and other implementations, the internal variable LNA of the first converter circuit 215a may receive the second signal at the first frequency and the first intermediate power level. In addition, the internal variable LNA of the first converter circuit 215a may amplify the second signal at the first frequency to the second intermediate power level. Amplification of the second signal by the external variable LNA of the first communication module 216a and/or the internal variable LNA of the first converter circuit 215a may be provided to compensate for insertion loss introduced by components in the first converter circuit 215a and/or the first buffer 213a (e.g., the receive portion of the first communication chain 210a may be configured as a liner receiver as discussed elsewhere in the present disclosure).

The first converter circuit 215a may downconvert the second signal to the baseband frequency and the second intermediate power level. The first buffer 213a may receive and buffer the second signal at the baseband frequency and the second intermediate power level. In some implementations, insertion loss introduced by the components in the first converter circuit 215a for downconverting the second signal to the baseband frequency and the first buffer 213a may cause the power level of the second signal to become the amplified power level at an output of the first buffer 213a.

The chain isolator circuit 222 may receive the second signal at the baseband frequency and the amplified power level from the first buffer 213a. The chain isolator circuit 222 may also receive the second signal at the baseband frequency at the initial power level (e.g., prior to amplification by the second PA 214b). The chain isolator circuit 222 may provide the second signal at the baseband frequency and the initial power level to the inverter circuit 226. In addition, the chain isolator circuit 222 may provide the second signal at the baseband frequency and the amplified power level to the inverter circuit 226.

The inverter circuit 226 may calibrate the second pre-distortion parameters to compensate for the non-linearity in amplification of the second signal provided by the second PA 214b. The inverter circuit 226 may calibrate the second pre-distortion parameters in the same or similar manner as discussed above in relation to the first pre-distortion parameters. In addition, the second pre-distorter circuit 212b may pre-distort subsequent signals based on the second pre-distortion parameters in the same or similar manner as the first pre-distorter circuit 212a may pre-distort subsequent signals based on the first pre-distortion signals.

In some implementations, responsive to calibration of one or more of the pre-distortion parameters, the MIMO transceiver 217 may verify performance of DPD calibration and DPD application for the corresponding communication chains 210. In these and other implementations, one or more link parameters for the corresponding communication chains 210 may be determined. The link parameters post performance of DPD calibration and DPD application may be compared to the corresponding link parameters prior to performance of DPD calibration and DPD application. The link parameters may include an error vector magnitude (EVM), a modulation coding schema (MCS), an output power level on the corresponding PAs 214, or any other appropriate link parameter.

In some implementations, the chain isolator circuit 222 may receive a combined signal. The combined signal may include the first signal, the second signal, the third signal, or any other signal at the first frequency for performing DPD calibration. The chain isolator circuit 222 may isolate the different signals included in the combined signal. Isolation of the different signals included in the combined signal according to some embodiments is discussed in U.S. patent application Ser. No. 15/826,632 filed Jul. 15, 2019 and titled "MIMO WIFI TRANSCEIVER WITH ROLLING GAIN OFFSET PRE-DISTORTION CALIBRATION," which is incorporated in the present disclosure by reference.

In some implementations, the combined signal may be used to simultaneously perform DPD calibration for two or more communication chains 210. In other implementations, the combined signal may be used to perform DPD calibration for a subsequent communication chain without stopping transmission of the signal of the communication chain 210 that was previously having DPD calibration performed for. For example, if DPD calibration for the first communication chain 210a was previously being performed and DPD calibration for the second communication chain 210b is to be performed, the chain isolator circuit 222 may permit the first communication chain 210a to continue transmitting the first signal while the second communication chain 210b transmits the second signal.

To isolate the different signals, the chain isolator circuit 222 may monitor the different signals at the initial power levels. In addition, the chain isolator circuit 222 may scale the various signals from the initial power levels and subtract the scaled signals from the combined signal except for the scaled signal corresponding to the communication chain 210 that DPD calibration is being performed for (e.g., may generate a subtracted signal). The chain isolator circuit 222 may provide the subtracted signal to the inverter circuit 226. The inverter circuit 226 may calibrate the corresponding pre-distortion parameters using the subtracted signal in the same or similar manner as discussed above in relation to calibrating the first pre-distortion parameters using the first signal.

In some implementations, the communication chains 210, in addition to wirelessly transmitting signals for performing DPD calibration, may transmit signals representative of data to be provided to the computing devices 105. For example, the first PA 214a may amplify signals representative of the data and the first communication module 216a may wirelessly transmit the signals representative of the data to the computing devices 105.

The receive portions of the communication chains 210 may be linear receivers. Specific components of the receive portions are discussed in more detail below in relation to FIG. 3. The receive portions being configured as linear receivers may permit the various signals to propagate through the components within the receive portions without introducing insertion loss. The receive portions being configured as linear receivers may ensure that the various signals received by the DPD circuit 220 are at power levels that are the same as or similar to the power level of the various signals after being amplified by the corresponding PAs 214. In addition, the receive portions being configured as linear receivers may avoid distortion of the various signals in the receive portions and may ensure that any difference in the power levels detected by the DPD circuit 220 is caused by the corresponding PAs 214.

In some implementations, an optimal communication chain of the communication chains 210 may be selected for performing DPD calibration based on one or more corresponding link parameters. For example, in some implementations, the optimal communication chain 210 may be selected based on the EVM, the MCS, the output power level on the corresponding PA 214, or any other appropriate link parameter. In some implementations, DPD calibration for the optimal communication chain may be performed and the pre-distortion parameters that are calibrated for the optimal communication chain may be used for DPD application of each of the communication chains 210. For example, the first pre-distortion parameters may be provided to the second pre-distorter circuit 212b and the third pre-distorter circuit 212c to pre-distort the second signal and the third signal, respectively.

FIG. 2 illustrates an implementation of the MIMO transceiver 217 with more than two communication chains 210. In another implementation, the MIMO transceiver 217 may include exactly two communication chains 210. In such an implementation, the chain isolator circuit 222 may be omitted from the DPD circuit 220. Alternatively or additionally, the chain isolator circuit 222 may be omitted from the DPD circuit 220 where the MIMO transceiver 217 includes more than two communication chains 210 and where the MIMO transceiver 217 operates the communication chains 210 as transmit chains one at a time, together with one communication chain 210 operated as a receive chain, during DPD calibration.

Figure 3:
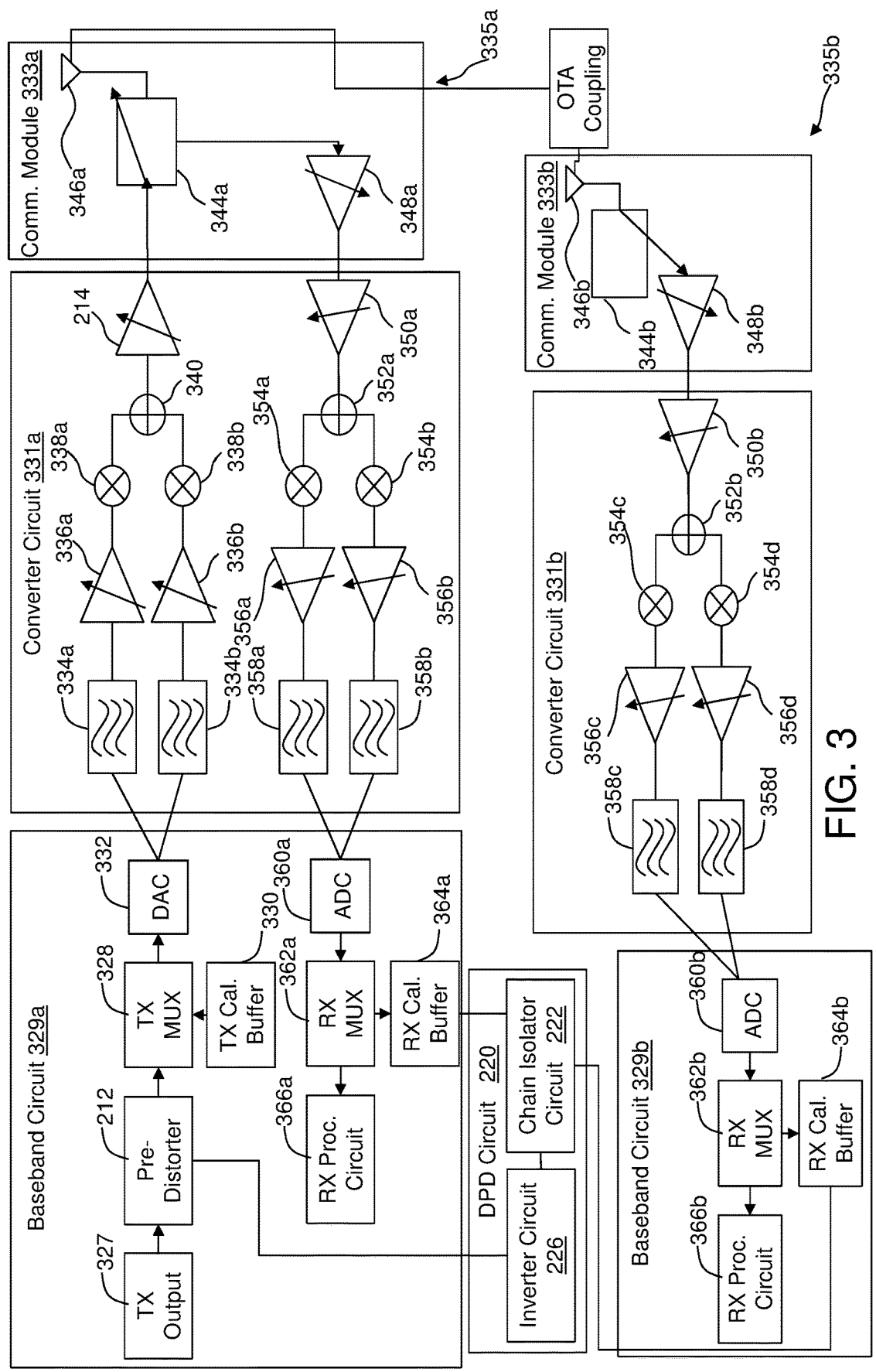
FIG. 3 illustrates a DPD circuit and example communication chains that may be implemented in the MIMO transceiver of FIG. 2.

FIG. 3 illustrates the DPD circuit 220 and example communication chains 335a-b that may be implemented in the MIMO transceiver 217 of FIG. 2, in accordance with at least one implementation disclosed in the present disclosure. A first communication chain 335a and a second communication chain 335b (referenced collectively in the present disclosure as "communication chains 335") may correspond to the communication chains 210 of FIG. 2. The first communication chain 335a of FIG. 3 is illustrated with both a transmit chain and a receive chain. Although the second communication chain 335b is illustrated in FIG. 3 with only a receive chain, it may also include a transmit chain.

The communication chains 335 may include baseband circuits 329a-b, converter circuits 331a-b, and communication modules 333a-b. The baseband circuits 329a-b and the communication modules 333ab may correspond to the converter circuits 215 and the communication modules 216 of FIG. 2, respectively. The communication chains 335 may be configurable in the receive mode or the transmit mode. In addition, the communication chains 335 may transmit calibration signals for performing DPD calibration or signals representative of data to be received by the computing devices 105. Further, the communication chains 335 may be configured to receive signals representative of data from the computing devices 105 and/or to receive calibration signals output by other communication chains on a same MIMO transceiver as the communication chains 335.

An example of generation and processing of the calibration signals by the communication chains 335 for preforming DPD calibration and DPD application will now be discussed. In this example, DPD calibration of the first communication chain 335a is performed through OTA coupling to the second communication chain 335b. The same process may be applied, mutatis mutandis, to perform DPD calibration of the second communication chain 335b (or other communication chains 335) through OTA coupling to the first communication chain 335a (or other communication chain 335).

A transmit calibration buffer 330 of the first communication chain 335a may receive and buffer an internal calibration signal at the baseband frequency (e.g., the first signal, the second signal, or the third signal). A transmit MUX 328 of the first communication chain 335a may selectively provide the internal calibration signal at the baseband frequency or the signals representative of data at the baseband frequency. In particular, the transmit MUX 328 may select output of the transmit calibration buffer 330 or of the pre-distorter circuit 212 of the first communication chain 335a to output for further processing. During performance of DPD calibration, the transmit MUX 328 may provide the internal calibration signal at the baseband frequency to a digital to analog converter (DAC) 332 of the first communication chain 335a. The DAC 332 may convert the internal calibration signal at the baseband frequency from a digital signal to an analog signal (e.g., may generate an internal analog calibration signal). In some implementations, the DAC 332 may generate a first component and a second component of the internal calibration signal. For example, the DAC 332 may include two internal DACs that each generate a different one of the first component and the second component of the internal calibration signal. In these and other implementations, the first and second components of the internal calibration signal may be real and imaginary portions of the internal analog calibration signal.

A first transmit filter 334a and a second transmit filter 334b (referenced collectively in the present disclosure as "transmit filters 334") of the first communication chain 335a may receive the first and second components of the internal calibration signal from the DAC 332, respectively. The transmit filters 334 may be configured to filter out portions of the first and second components of the internal calibration signal. For example, in some implementations, the transmit filters 334 may be configured to filter noise from the first and second components of the internal calibration signal. In some implementations, the transmit filters 334 may include bandpass filters, lowpass filters, highpass filters, or any other appropriate filter.

A first transmit variable amplifier 336a and a second transmit variable amplifier 336b (referenced collectively in the present disclosure as "transmit variable amplifiers 336") of the first communication chain 335a may receive the first and second components of the internal calibration signal at an initial power level from the transmit filters 334, respectively. The transmit variable amplifiers 336 may be configured to provide a variable gain to the first and second components of the internal calibration signal. The transmit variable amplifiers 336 may amplify the first and second components of the internal calibration signal to a first power level.

A first transmit mixer 338a and a second transmit mixer 338b (referenced collectively in the present disclosure as "transmit mixers 338") of the first communication chain 335a may receive the first and second components of the internal calibration signal at the first power level, respectively. In some implementations, the transmit mixers 338 may also receive a shift signal at a shift frequency. The shift frequency may be equal to a frequency difference of the baseband frequency and the first frequency. The transmit mixers 338 may upconvert the frequency of the first and second components of the internal calibration signal from the baseband frequency to the first frequency using the shift signal. For example, the first transmit mixer 338a may upconvert the first component of the internal calibration signal to the first frequency. As another example, the second transmit mixer 338b may upconvert the second component of the internal calibration signal to the first frequency. In some embodiments, the first and second components of the internal calibration signal may be upconverted by quadrature components of RF voltage-controlled oscillators (VCOs).

A summer 340 of the first communication chain 335a may receive the first and second components of the internal calibration signal at the first frequency and the first power level. The summer 340 may combine the first and second components of the internal calibration signal into the internal analog calibration signal at the first frequency and the first power level. For example, the summer 340 may mix the first and second components of the internal calibration signal into a single RF waveform. The PA 214 of the first communication chain 335a may receive and amplify the internal analog calibration signal at the first frequency. For example, the PA 214 may amplify the internal analog calibration signal at the first frequency to a second power level (e.g., may amplify the internal calibration signal at the first frequency to an operational power level of the PA 214). The PA 214 may provide non-linear amplification for which the pre-distortion parameters may be calibrated to compensate for.

Switches 344a-b of the communication chains 335 may selectively transition between a transmit position and a receive position. In the transmit position, the communication chains 335 may be in the transmit mode, e.g., the communication module 333a may be coupled through the switch 344a to wirelessly transmit signals received from the transmit chain of the first communication chain 335a. In the receive position, the communication chains 335 may be in the receive mode, e.g., the communication module 333a may wirelessly receive signals that may be coupled through the switch 344a to the receive chain of the first communication chain 335a.

Continuing with the example DPD calibration process, the switch 344a may receive the internal analog calibration signal at the first frequency and the second power level from the PA 214. In addition, the switch 344a, in the transmit position, may provide the internal analog calibration signal at the first frequency and the second power level to an antenna 346a of the first communication chain 335a. The antenna 346a may wirelessly transmit the internal analog calibration signal at the first frequency and the second power level to one or more other communication chains 210, such as the second communication chain, 335b.

The internal calibration signal wirelessly transmitted by the antenna 346a of the first communication chain 335a is received by the antenna 346b as an external calibration signal at the first frequency and the second power level.

The switch 344b of the second communication chain 335b may receive the external calibration signal from the antenna 346b. In addition, the switch 344b, in the receive position, may provide the external calibration signal at the first frequency and the second power level to an external amplifier 348b (e.g., the external variable LNAs discussed above in relation to FIG. 2) of the second communication chain 335b. The external amplifier 348b may amplify the external calibration signal. For example, the external amplifier 348a may amplify the external calibration signal at the first frequency to a third power level. In some implementations, the external amplifier 348b may be omitted.

An internal amplifier 350b of the second communication chain 335b may receive the external calibration signal at the first frequency and the third power level. In addition, the internal amplifier 350b may amplify the external calibration signal at the first frequency to a fourth power level. A subtractor 352b of the second communication chain 335b may receive the external calibration signal at the first frequency and the fourth power level from the internal amplifier 350b. The subtractor 352b may separate the external calibration signal into a third component and a fourth component at the first frequency and the fourth power level. In some implementations, the third and fourth components may be real and imaginary portions of the external calibration signal.

A first receive mixer 354c of the second communication chain 335b and a second receive mixer 354d of the second communication chain 335b may receive the third and fourth components of the external calibration signal at the first frequency and the fourth power level. In some implementations, the receive mixers 354c-d may also receive the shift signal at the shift frequency. The receive mixers 354c-d may downconvert the frequency component of the third and fourth components of the external calibration signal from the first frequency to the baseband frequency using the shift signal.

A first receive variable amplifier 356c and a second receive variable amplifier 356d of the second communication chain 335b may receive the third and fourth components of the external calibration signal (e.g., the real and imaginary portions of the external calibration signal) at the baseband frequency and the fourth power level, respectively. The receive variable amplifiers 356c-d may amplify the third and fourth components of the external calibration signal to a fifth power level.

In some implementations, the third power level, the fourth power level, and the fifth power level may be determined based on an insertion loss of other components in the receive portion of the second communication chain 335b. Amplifying the third and fourth components of the external calibration signal (e.g., the real and imaginary portions of the external calibration signal) to the third power level, the fourth power level, and the fifth power level to compensate for insertion loss of the components in the receive portion may cause the receive portion to be configured as a linear receiver.

A first receive filter 358c and a second receive filter 358d of the second communication chain 335b may receive the third and fourth components of the external calibration signal (e.g., the real and imaginary components of external calibration signal), respectively. In addition, the receive filters 358c-d may filter out portions of the third and fourth components of the external calibration signal. In some implementations, the receive filters 358c-d may include bandpass filters, lowpass filters, highpass filters, or any other appropriate filter. In some implementations, the receive filters 358c-d may be configured to filter out noise from the third and fourth components of the external calibration signal. An analog to digital converter (ADC) 360b of the second communication chain 335b may receive the third and fourth components of the external calibration signal at the baseband frequency and the fifth power level from the receive filters 358c-d. The ADC 360b may combine and convert the third and fourth components of the calibration signal to a digital signal at the baseband frequency and the fifth power level (e.g., may generate a digital calibration signal).

A receive MUX 362b of the second communication chain 335b may selectively provide the digital calibration signal at the baseband frequency or the signals representative of data at the baseband frequency to a receive calibration buffer 364b of the second communication chain 335b or a receive processing circuit 366b of the second communication chain 335b, respectively. During performance of DPD calibration, the receive MUX 362b may provide the digital calibration signal to the receive calibration buffer 364b. The receive calibration buffer 364b may buffer the digital calibration signal. In addition, the receive calibration buffer 364b may provide the digital calibration signal (e.g., a buffered calibration signal) to the chain isolator circuit 222 of the DPD circuit 220. The chain isolator circuit 222 and/or the inverter circuit 226 of the DPD circuit 220 may calibrate the pre-distortion parameters of the first communication chain 335a based on the buffered calibration signal received from the second communication chain 335b as discussed above in relation to FIG. 2.

The inverter circuit 226 may then provide the pre-distortion parameters to the pre-distorter circuit 212 of the first communication chain 335a. The pre-distorter circuit 212 may pre-distort subsequent signals based on the pre-distortion parameters. For example, the pre-distorter circuit 212 may pre-distort the signals representative of data received from a transmit output circuit 327 of the first communication chain 335a. The baseband circuit 329a, the converter circuit 331a, and the communication module 333a of the first communication chain 335a may process the signals representative of data in the same or similar manner as the calibration signals. The receive processing circuit 366a, 336b may receive the signals representative of the data from the receive MUX 362a, 362b, respectively for additional processing.

The first communication chain 335a may include one or more of an external amplifier 348a, an internal amplifier 350a, a subtractor 352a, a first mixer 354a, a second mixer 354b, a first receive variable gain amplifier 356a, a second receive variable gain amplifier 356b, a first receive filter 358a, a second receive filter 358b, an ADC 360a, a receive MUX 362, a receive calibration buffer 364a, and the receive processing circuit 366a. Each of these components in the first communication chain 335a may operate in the same or similar manner as the corresponding components in the second communication chain 335b.

Although not illustrated in FIG. 3, the second communication chain 335b may include one or more of a transmit output circuit (similar to the transmit output circuit 327), a pre-distorter circuit 212, a transmit MUX (similar to the transmit MUX 328), a DAC (similar to the DAC 332), first and second transmit filters (similar to the transmit filters 336a-b), first and second transmit variable gain amplifiers (similar to the transmit variable gain amplifiers 336a-b), first and second transmit mixers (similar to the transmit mixers 338a-b), a summer (similar to the summer 340), and a PA 214, Each of these components in the second communication chain 335b may operate in the same or similar manner as the corresponding components in the first communication chain 335a.

The box labelled OTA coupling in FIG. 3 is illustrated for example purposes. More generally, the first communication chain 335a may be wirelessly coupled to any appropriate communication chain 210, 335 within the MIMO transceiver 217.

Figure 4:
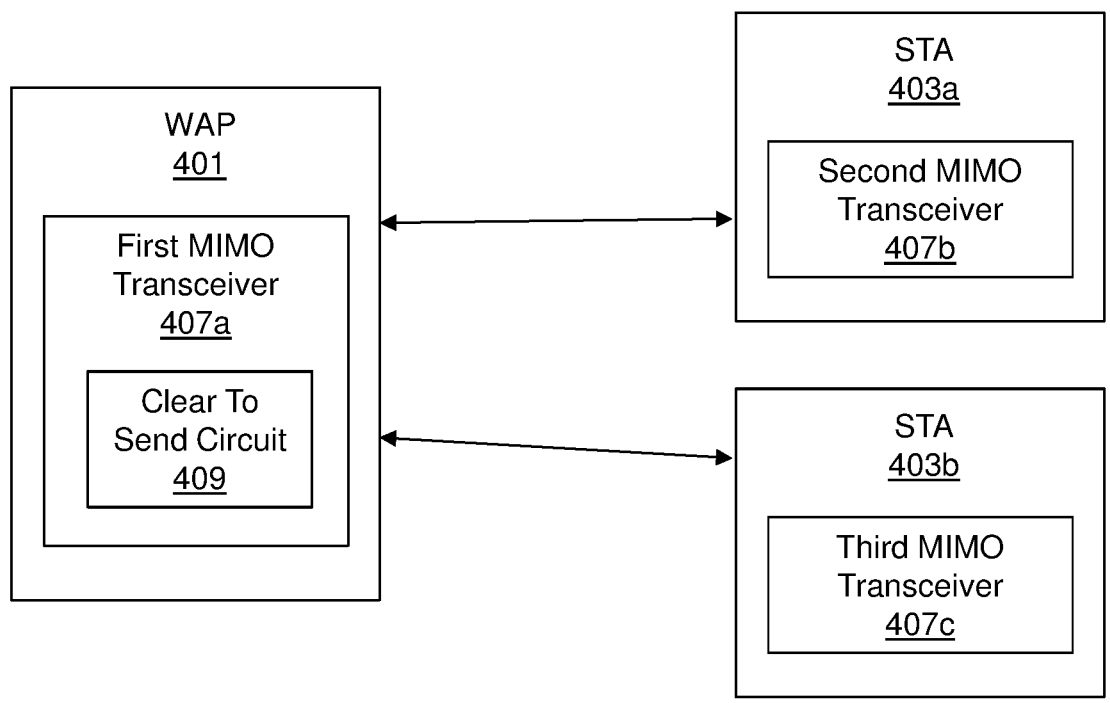
FIG. 4 illustrates an example environment that includes a WAP and wireless stations (STAs)

FIG. 4 illustrates an example environment 400 that includes a WAP 401 and STAs 403a, 403b, in accordance with at least one implementation disclosed in the present disclosure. Each of the WAP 401 and the STAs 403a, 403b respectively include a first MIMO transceiver 407a, a second MIMO transceiver 407b, or a third MIMO transceiver 407c (referred to collectively herein as MIMO transceivers 407). Each of the MIMO transceivers 407 may correspond to the MIMO transceivers 102 and 217 of FIGS. 1 and 2.

The first MIMO transceiver 407a may include a clear-to-send (CTS) circuit 409. Although not illustrated in FIG. 4, either or both of the second and third MIMO transceivers 407b, 407c may include a similar CTS circuit. The CTS circuit 409 may transmit a CTS-to-self signal. The CTS-to-self signal may reserve a duration of time for the first MIMO transceiver 407a to perform DPD calibration using the communication chains 210 (not illustrated in FIG. 4). In some implementations, the CTS-to-self signal may indicate a duration of time that the second MIMO transceiver 407b, and/or the third MIMO transceiver 407c are not to wirelessly transmit signals at least at the first frequency. Reserving the duration of time for the first MIMO transceiver 407a to perform DPD calibration may avoid uplink interference caused by signals transmitted by the second MIMO transceiver 407b or the third MIMO transceiver 407c.

Figure 5:
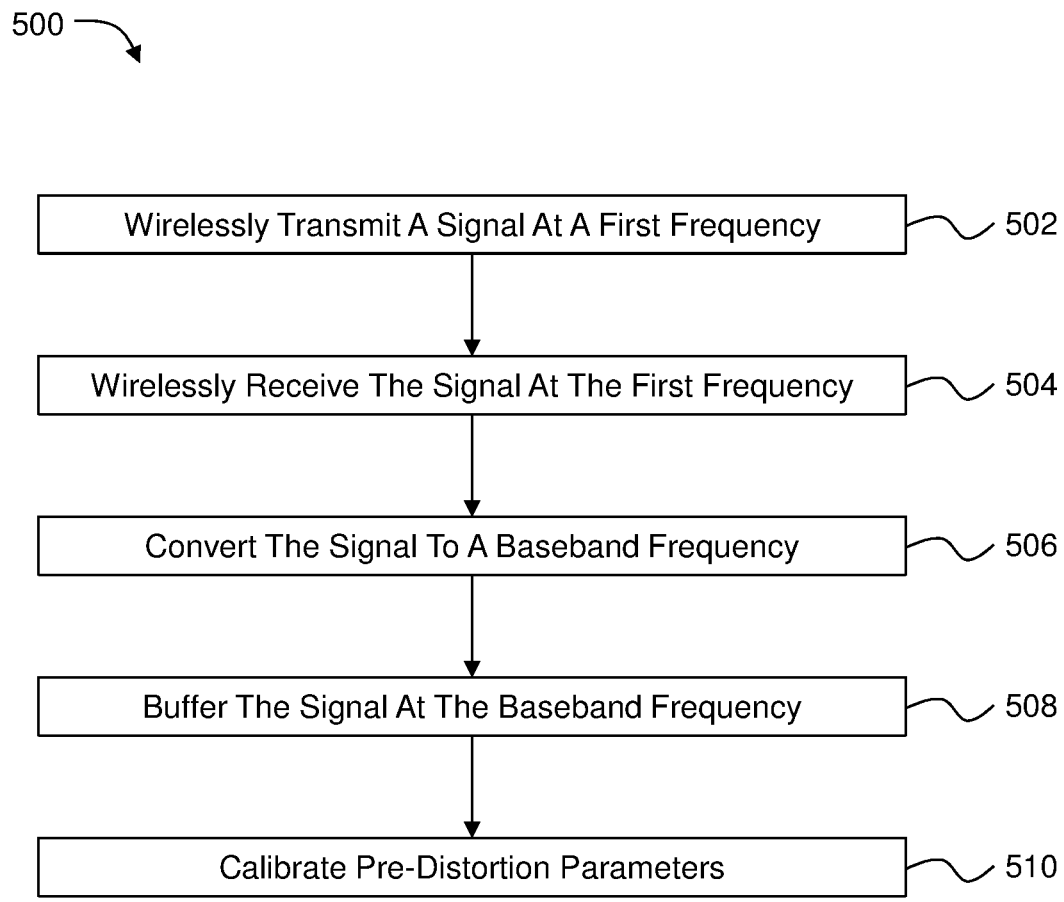
FIG. 5 illustrates a flowchart of an example method of operating a MIMO transceiver, all according to at least one implementation described in the present disclosure.

FIG. 5 illustrates a flowchart of an example method 500 of operating a MIMO transceiver, in accordance with at least one implementation disclosed in the present disclosure. In some implementations, the method of operating the MIMO transceiver may permit DPD calibration for the communication chains to be performed using OTA coupling between the communication chains. The method 500 may be performed by any suitable system, apparatus, or device with respect to DPD calibration for the communication chains within the MIMO transceiver. For example, the MIMO transceivers 102, 217, and 407 of FIGS. 1, 2, and 4 may perform or direct performance of one or more of the operations associated with the method 500 with respect to DPD calibration for the communication chains 210. Although illustrated with discrete blocks, the steps and operations associated with one or more of the blocks of the method 500 may be divided into additional blocks, combined into fewer blocks, or eliminated, depending on the particular implementation.

The method 500 may include a block 502, at which a signal may be wirelessly transmitted at a first frequency. In some implementations, the signal at the first frequency may be wirelessly transmitted from a first communication chain of the MIMO transceiver. For example, the signal at the first frequency may be wirelessly transmitted from the first communication module 216a of the first communication chain 210a of FIG. 2. In these and other implementations, the first communication chain may include a pre-distorter circuit that accepts pre-distortion parameters to pre-distort signals prior to transmission. For example, the first pre-distorter circuit 212a of FIG. 2 may accept the first pre-distortion parameters to pre-distort signals prior to transmission. In addition, the first communication chain may include a PA that amplifies the signals of the first communication chain prior to transmission. For example, the first PA 214a of FIG. 2 may amplify the signals prior to transmission by the first communication module 216a.

At block 504, the signal may be wirelessly received at the first frequency. In some implementations, the signal at the first frequency may be wirelessly received at a second communication chain of the MIMO transceiver. For example, the signal may be wirelessly received by the second communication module 216b of FIG. 2. At block 506, the signal may be converted to a baseband frequency. In some implementations, the signal may be converted to the baseband frequency by the second converter circuit 215b of FIG. 2. At block 508, the signal may be buffered at the baseband frequency. For example, the signal may be buffered at the baseband frequency by the second buffer 213b of FIG. 2.

At block 510, the pre-distortion parameters may be calibrated. In some implementations, the pre-distortion parameters may be calibrated based on the buffered signal. In these and other implementations, the pre-distortion parameters may be calibrated to compensate for non-linearity in amplification provided by the PA of the first communication chain. For example, the first pre-distortion parameters may be calibrated by the DPD circuit 220 of FIG. 2 to compensate for non-linearity in amplification provided by the first PA 214a.

Modifications, additions, or omissions may be made to the method 500 without departing from the scope of the present disclosure. For example, the operations of method 500 may be implemented in differing order. Additionally or alternatively, two or more operations of the method 500 may be performed at the same time. Furthermore, the outlined operations and actions of the method 500 are only provided as examples, and some of the operations and actions may be optional, combined into fewer operations and actions, or expanded into additional operations and actions without detracting from the essence of the disclosed implementations. In addition, in some implementations, the method 500 may be performed iteratively in which one or more operations may be performed for multiple communication chains in the MIMO transceiver.

Implementations described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A multiple input multiple output (MIMO) transceiver configured for digital pre-distortion (DPD) calibration, the MIMO transceiver comprising:
   a first communication chain that includes both a first receive chain and a first transmit chain, the first transmit chain configured to wirelessly transmit a calibration signal at a first frequency, the first transmit chain comprising a pre-distorter circuit configured to accept pre-distortion parameters to pre-distort data signals prior to transmission and a power amplifier (PA) configured to amplify the data signals of the first transmit chain prior to transmission;
   a second communication chain that includes both a second receive chain and a second transmit chain, the second receive chain configured to wirelessly receive the calibration signal at the first frequency, the second receive chain comprising:
      a converter circuit configured to convert the calibration signal to a baseband frequency; and
      a buffer configured to buffer the calibration signal at the baseband frequency; and
   a DPD circuit configured to calibrate the pre-distortion parameters based on the buffered calibration signal to compensate for non-linearity in amplification provided by the PA of the first transmit chain,
   wherein the first communication chain is configured to be in a transmit mode to transmit the calibration signal while the second communication chain is configured to simultaneously be in a receive mode to receive the calibration signal.

2. The MIMO transceiver of claim 1 further comprising a clear to send circuit configured to transmit a CTS-to-Self signal to other MIMO transceivers within an operational environment of the MIMO transceiver, the CTS-to-Self signal reserving a duration of time for the MIMO transceiver to perform DPD calibration using the first communication chain and the second communication chain.

3. The MIMO transceiver of claim 1, wherein the calibration signal comprises a first calibration signal, the converter circuit comprises a first converter circuit, the pre-distorter circuit comprises a first pre-distorter circuit, the PA comprises a first PA, the pre-distortion parameters comprise first pre-distortion parameters, and the buffer comprises a first buffer, and responsive to calibration of the first pre-distortion parameters, the first transmit chain is further configured to stop wirelessly transmitting the first calibration signal and the second transmit chain is configured to start wirelessly transmitting a second calibration signal at the first frequency, and:
   the second transmit chain comprises:
      a second pre-distorter circuit configured to accept second pre-distortion parameters to pre-distort data signals prior to transmission; and
      a second PA configured to amplify the data signals of the second transmit chain prior to transmission; and
   the first receive chain is configured to wirelessly receive the second calibration signal at the first frequency, the first receive chain comprises:
      a second converter circuit configured to convert the second calibration signal to the baseband frequency; and
      a second buffer configured to buffer the second calibration signal at the baseband frequency, the DPD circuit further configured to calibrate the second pre-distortion parameters based on the buffered second calibration signal to compensate for non-linearity in amplification provided by the second PA of the second transmit chain.

4. The MIMO transceiver of claim 1, wherein the calibration signal comprises a first calibration signal, the pre-distorter circuit comprises a first pre-distorter circuit, the PA comprises a first PA, and the MIMO transceiver further comprises a third communication chain configured to wirelessly transmit a second calibration signal at the first frequency, the third communication chain comprising a second pre-distorter circuit configured to accept second pre-distortion parameters to pre-distort data signals prior to transmission and a second PA configured to amplify the data signals of the third communication chain prior to transmission, and the second receive chain is further configured to receive a combined calibration signal that includes the first calibration signal and the second calibration signal at the first frequency, and the DPD circuit is further configured to:
   isolate the first calibration signal and the second calibration signal from the combined calibration signal; and
   calibrate the second pre-distortion parameters based on the second calibration signal to compensate for non-linearity in amplification provided by the second PA of the third transmit chain.

5. The MIMO transceiver of claim 1, wherein the calibration signal comprises a first calibration signal, the MIMO transceiver further comprises a third communication chain configured to wirelessly transmit a second calibration signal at the first frequency, and responsive to calibration of the pre-distortion parameters:
   the first transmit chain is configured to stop wirelessly transmitting the first calibration signal; and
   the third communication chain is configured to start wirelessly transmitting the second calibration signal.

6. The MIMO transceiver of claim 5, the pre-distorter circuit comprises a first pre-distorter circuit, the PA comprises a first PA, the pre-distortion parameters comprise first pre-distortion parameters, and the third communication chain comprises a second pre-distorter circuit configured to accept second pre-distortion parameters to pre-distort data signals prior to transmission and a second PA configured to amplify the data signals of the third communication chain prior to transmission, wherein:

the second receive chain is further configured to wirelessly receive the second calibration signal at the first frequency;

the converter circuit is further configured to convert the second calibration signal to the baseband frequency;

the buffer is further configured to buffer the second calibration signal at the baseband frequency; and the DPD circuit is further configured to calibrate the second pre-distortion parameters based on the buffered second calibration signal to compensate for non-linearity in amplification provided by the second PA of the third communication chain.

7. The MIMO transceiver of claim 1, wherein the buffer is a first buffer, and the converter circuit is a first converter circuit, the first communication chain comprising:

a second buffer configured to buffer data signals to be transmitted by the first communication chain at the baseband frequency; and a second converter circuit configured to convert the data signals to be transmitted by the first communication chain to the first frequency, the pre-distorter circuit configured to pre-distort the data signals at the first frequency based on the pre-distortion parameters, the first communication chain is configured to wirelessly transmit the data signals at the first frequency.

8. The MIMO transceiver of claim 1, wherein the pre-distorter circuit uses the pre-distortion parameters to compensate for the non-linearity in amplification provided by the PA of the first transmit chain by pre-distorting data signals transmitted by the first transmit chain equal to an additive inverse of the non-linearity in amplification provided by the PA of the first transmit chain.

9. The MIMO transceiver of claim 1, wherein the second receive chain further comprises an analog to digital converter configured to convert the calibration signal at the baseband frequency to a digital calibration signal.

10. The MIMO transceiver of claim 1, wherein the second receive chain is configured as a linear receive chain to avoid distortion of the calibration signal in the second receive chain.

11. The MIMO transceiver of claim 1, wherein the second transmit chain is configured to wirelessly transmit data signals at the first frequency.

12. The MIMO transceiver of claim 1, wherein the first transmit chain further comprises a digital to analog converter configured to convert the calibration signal at the baseband frequency to an analog calibration signal.

13. The MIMO transceiver of claim 1, wherein the first communication chain and the second communication chain share a DPD calibration chain that includes the DPD circuit.

14. A method to operate a multiple input multiple output (MIMO) transceiver configured for digital pre-distortion (DPD) calibration, the method comprising:

wirelessly transmitting a calibration signal at a first frequency from a first communication chain of the MIMO transceiver, the first communication chain including both a first receive chain and a first transmit chain, the first transmit chain comprising a pre-distorter circuit configured to accept pre-distortion parameters to pre-distort data signals prior to transmission and a power amplifier (PA) configured to amplify the data signals of the first transmit chain prior to transmission;

wirelessly receiving the calibration signal at the first frequency at a second communication chain of the MIMO transceiver, the second communication chain including both a second receive chain and a second transmit chain;

converting, by the second receive chain, the calibration signal to a baseband frequency;

buffering, by the second receive chain, the calibration signal at the baseband frequency; and calibrating the pre-distortion parameters based on the buffered calibration signal to compensate for non-linearity in amplification provided by the PA of the first transmit chain.

15. The method of claim 14 further comprising transmitting a CTS-to-Self signal to other MIMO transceivers within an operational environment of the MIMO transceiver, the CTS-to-Self signal reserving a duration of time for the MIMO transceiver to perform DPD calibration using the first communication chain and the second communication chain.

16. The method of claim 14, wherein the calibration signal comprises a first calibration signal, the pre-distorter circuit comprises a first pre-distorter circuit, the PA comprises a first PA, the pre-distortion parameters comprise first pre-distortion parameters, and responsive to calibration of the first pre-distortion parameters, the method further comprises:

stopping wireless transmission of the first calibration signal from the first communication chain of the MIMO transceiver;

starting wireless transmission of a second calibration signal at the first frequency from the second transmit chain of the second communication chain of the MIMO transceiver, the second transmit chain comprising a second pre-distorter circuit configured to accept second pre-distortion parameters to pre-distort data signals prior to transmission and a second PA configured to amplify the data signals of the second transmit chain prior to transmission;

wirelessly receiving the second calibration signal at the first frequency at the first communication chain of the MIMO transceiver;

converting, by the first receive chain, the second calibration signal to the baseband frequency;

buffering, by the first receive chain, the second calibration signal at the baseband frequency; and calibrating the second pre-distortion parameters based on the buffered second calibration signal to compensate for non-linearity in amplification provided by the second PA of the second transmit chain.

17. The method of claim 14, wherein the calibration signal comprises a first calibration signal, the pre-distortion parameters comprise first pre-distortion parameters, the pre-distorter circuit comprises a first pre-distorter circuit, and the PA comprises a first PA, the method further comprising:

wirelessly transmitting a second calibration signal at the first frequency from a third communication chain of the MIMO transceiver, the third communication chain comprising a second pre-distorter circuit configured to accept second pre-distortion parameters to pre-distort data signals prior to transmission and a second PA configured to amplify the data signals of the third communication chain prior to transmission;

receiving a combined calibration signal that includes the first calibration signal and the second calibration signal at the first frequency at the second communication chain of the MIMO transceiver;
isolating the first calibration signal and the second calibration signal from the combined calibration signal; and
calibrating the second pre-distortion parameters based on the second calibration signal to compensate for non-linearity in amplification provided by the second PA of the third communication chain.

18. The method of claim 14 further comprising:
buffering, by the first communication chain, data signals to be transmitted by the first communication chain at the baseband frequency;
converting, by the first communication chain, the data signals to be transmitted by the first communication chain to the first frequency;
pre-distorting the data signals to be transmitted by the first communication chain at the first frequency based on the pre-distortion parameters; and
wirelessly transmitting the data signals at the first frequency from the first communication chain of the MIMO transceiver.

19. The method of claim 14, wherein the calibration signal comprises a first calibration signal and responsive to calibration of the pre-distortion parameters, the method further comprises:
stopping wireless transmission of the first calibration signal from the first communication chain of the MIMO transceiver; and
starting wireless transmission of a second calibration signal from a third communication chain of the MIMO transceiver.

20. The method of claim 19, wherein the pre-distortion parameters comprise first pre-distortion parameters, the PA comprises a first PA, the pre-distorter circuit comprises a first pre-distorter circuit, and the third communication chain comprises a second pre-distorter circuit configured to accept second pre-distortion parameters to pre-distort data signals of the third communication chain prior to transmission and a second PA configured to amplify the data signals of the third communication chain prior to transmission, the method further comprising:
wirelessly receiving the second calibration signal at the first frequency at the second communication chain of the MIMO transceiver;
converting, by the second receive chain, the second calibration signal to the baseband frequency;
buffering, by the second receive chain, the second calibration signal at the baseband frequency; and
calibrating the second pre-distortion parameters based on the buffered second calibration signal to compensate for non-linearity in amplification provided by the second PA of the third communication chain.

21. The method of claim 14 further comprising converting the calibration signal at the baseband frequency to a digital calibration signal.

* * * * *